United States Patent
Carpelan

(10) Patent No.: US 8,072,924 B2
(45) Date of Patent: *Dec. 6, 2011

(54) ASSIGNING RADIO CHANNELS IN A WIRELESS NETWORK

(75) Inventor: Paulus Carpelan, Heisinki (FI)

(73) Assignee: Wi-LAN, Inc., Ottawa, Ontario (CA)

( * ) Notice: Subject to any disclaimer, the term of this patent is extended or adjusted under 35 U.S.C. 154(b) by 586 days.

This patent is subject to a terminal disclaimer.

(21) Appl. No.: 11/948,311

(22) Filed: Nov. 30, 2007

(65) Prior Publication Data

US 2008/0089284 A1    Apr. 17, 2008

Related U.S. Application Data

(63) Continuation of application No. 09/851,436, filed on May 9, 2001, now Pat. No. 7,317,704.

(30) Foreign Application Priority Data

May 12, 2000  (FI) .................................... 20001138

(51) Int. Cl.
H04W 4/00 (2009.01)
H04M 1/00 (2006.01)

(52) U.S. Cl. ...................................... 370/328; 455/550.1

(58) Field of Classification Search .................. None
See application file for complete search history.

(56) References Cited

U.S. PATENT DOCUMENTS

| | | | |
|---|---|---|---|
| 5,918,181 A * | 6/1999 | Foster et al. ............... | 455/456.1 |
| 6,131,038 A * | 10/2000 | Sekine .......................... | 455/513 |
| 6,167,446 A | 12/2000 | Lister et al. | |
| 6,286,044 B1 | 9/2001 | Aoyama | |
| 6,442,256 B1 | 8/2002 | Garland et al. | |
| 6,459,687 B1 | 10/2002 | Bourlas | |
| 6,549,759 B2 | 4/2003 | Arviv | |
| 6,577,863 B2 | 6/2003 | Bourlas | |
| 6,683,866 B1 | 1/2004 | Stanwood | |
| 6,693,887 B2 | 2/2004 | Stanwood | |
| 6,694,141 B1 * | 2/2004 | Pulkkinen et al. ............ | 455/454 |
| 6,728,514 B2 | 6/2004 | Bandeira | |
| 6,804,211 B1 | 10/2004 | Klein | |

(Continued)

FOREIGN PATENT DOCUMENTS

EP    1098489    6/2006

(Continued)

OTHER PUBLICATIONS

"Comparison of various WLAN base stations", http://web.archive.org/web/*/http://www.employees.org/~raj/wireless.html, Apr. 15, 2003.

(Continued)

Primary Examiner — Anh-Vu Ly
(74) Attorney, Agent, or Firm — Volpe and Koenig, P.C.

(57) ABSTRACT

The present invention relates to a method of assigning radio channels to a set of base stations (BS) in a wireless network, in which method one radio channel out of a determined set of radio channels is assigned to each base station (BS). In order for different networks not to interfere with each other, the available radio channels are assigned to the set of base stations (BS) upon manufacture of the base stations (BS) such that each radio channel appears substantially an equal number of times.

13 Claims, 2 Drawing Sheets

U.S. PATENT DOCUMENTS

| | | |
|---|---|---|
| 6,925,068 B1 | 8/2005 | Stanwood |
| 6,944,188 B2 | 9/2005 | Sinha |
| 6,956,834 B2 | 10/2005 | Stanwood |
| 6,963,617 B1 | 11/2005 | Armour |
| 7,006,530 B2 | 2/2006 | Spinar |
| 7,023,798 B2 | 4/2006 | Bourlas |
| 7,177,598 B2 | 2/2007 | Klein |
| 7,197,022 B2 | 3/2007 | Stanwood |
| 7,289,467 B2 | 10/2007 | Bourlas |
| 7,317,704 B2 | 1/2008 | Carpelan |
| 7,379,441 B2 | 5/2008 | Stanwood |
| 2008/0089284 A1 | 4/2008 | Carpelan |

FOREIGN PATENT DOCUMENTS

| | | |
|---|---|---|
| JP | 2000-092127 | 3/2000 |
| JP | 2000-268016 | 9/2000 |

OTHER PUBLICATIONS http://www.wi-fi.com.ua/download/avaya/GSG_RF.pdf, Avaya, Residential Gateway I, Getting Started Guide, 2001.

Miceli, Andrew, "Mobile Communication Seriers", Wireless Technician's Handbook, vol. 1999, pp. 60-62, part 3.5.

"Digilink 60 Professional Data Communications Point to point in 60 GHz band," Microwave Modules (UK) Ltd., Apr. 1995.

"Transmission and Multiplexing (TM); Parameters for radio-relay systems for the transmission of digital signals and analogue video signals operating at around 58 GHz, which do not require co-ordinated frequency planning," European Telecommunication Standard, 300 408, Mar. 1996.

* cited by examiner

ASSIGNING RADIO CHANNELS IN A WIRELESS NETWORK

CROSS REFERENCE TO RELATED APPLICATIONS

This application is a continuation of U.S. application Ser. No. 09/851,436, filed May 9, 2001, which is incorporated by reference in its entirety, and which application claims the right of priority based on Finland application no. 20001138, filed May 12, 2000.

BACKGROUND

The present invention relates to wireless local area networks and particularly to assigning radio channels therein.

Wireless local area networks (WLAN) comprise terminals, such as portable computers provided with WLAN cards and communicating on a radio wave via a base station. A base station creates a wireless local area network around itself whose coverage is about 20 to 50 m. In Europe, wireless local area networks have 13 radio channels at their disposal, one of which the base station determines to be used for local area network communication. Each wireless local area network also has to have a special network name, which is a common identifier of the base station and the terminals coupled to the network.

A solution is previously known, wherein base stations of wireless local area networks are provided with certain default settings at the manufacturing stage, whereby for example the same radio channel is selected as the default value for all base stations.

The problem in the above solution is interference between adjacent wireless local area networks. For example, in an apartment house environment, several separate wireless local area networks may be located at short distances from each other. If in this case the same radio channel is set to be used by the base stations, a situation arises wherein interference impairs the performance of the networks. In this case, the default channel is overloaded and the other channels are not used. End users are not always capable of changing channel settings and are not aware of the settings of surrounding interfering networks. This problem exists particularly in a home and small office environment. In larger companies, the situation is better since networks and channel assignment are generally carefully planned. Furthermore, an expert IT organization often maintains the networks, whereby no problems arise in reassignment of channels.

SUMMARY

The object of the invention is to solve the above problems by providing a user-friendlier solution enabling efficient utilization of different radio channels without such subsequent reassignment of radio channels that would require special knowledge. This object is achieved by a method of assigning radio channels to a set of base stations in a wireless network, in which method one radio channel out of a determined set of radio channels is assigned to each base station. The method is characterized by assigning available radio channels to the set of base stations during manufacture of the base stations in such a way that each radio channel occurs substantially an equal number of times.

The invention is based on the idea of assigning radio channels to base stations before they are taken into use such that all available radio channels are used equally. This minimizes interference between adjacent wireless networks, because in practice, base stations are likely to be distributed such that adjacent base stations do not use the same radio channel. This ensures network performance for a large number of terminals.

A first preferred embodiment of the inventive method first determines a given order for the radio channels. A first base station is then selected and one available radio channel is assigned thereto. Next, a second base station is selected, and the radio channel having the next order number is assigned thereto or, if the radio channel assigned to the first base station has the largest order number in the determined set of radio channels, then the radio channel having the smallest order number is assigned. Radio channels are assigned in this way according to order numbers in an ascending or descending order until radio channels are assigned to the entire set of base stations. This assignment of radio channels can be implemented with a simple counter for example such that a radio channel is selected for a first device in a production lot, and channels are then counted forward for each device manufactured. When the order number of a channel reaches a highest allowed order number, the next device is assigned the channel having the lowest allowed order number.

In a second preferred embodiment of the inventive method, a radio channel selected randomly out of a determined set of radio channels is assigned to a first base station. In this case, the starting order number is not always for example one, which would lead to a situation wherein radio channels having the number one would be in use the most, but radio channels are distributed as evenly as possible to the entire available channel domain.

In a third preferred embodiment of the inventive method, a radio channel derived out of a determined set of radio channels based on an individual serial number is assigned to each base station. This allows for example the use of the last two numbers of the serial number of the base station for indicating the order number of the radio channel to be assigned.

In a fourth preferred embodiment of the invention, radio channels are assigned to all base stations randomly. This is likely to ensure that radio channels are evenly assigned to a large number of devices.

The preferred embodiments of the inventive method are disclosed in the attached dependent claims.

BRIEF DESCRIPTION OF THE DRAWINGS

In the following, the invention will be described by way of example with reference to the attached figures, in which.

DETAILED DESCRIPTION

Figure 1:
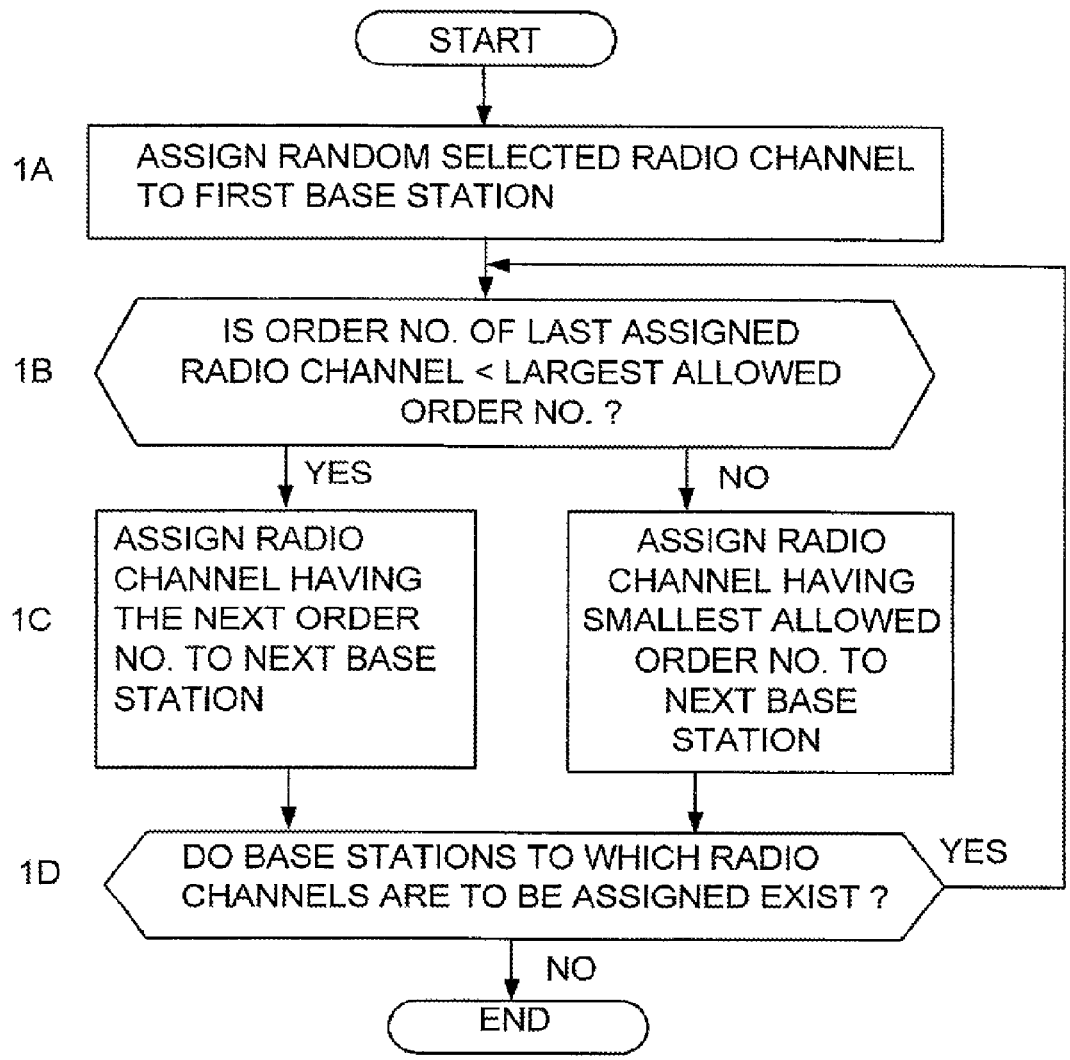
FIG. 1 is a flow chart of the method of the invention.

FIG. 1 is a flow chart of the method of the invention. Let us assume by way of example that a production lot involving base stations for wireless networks delivered to Europe is concerned, the number of available radio channels being 13 and the radio channels being numbered from one to 13. In step 1A, a randomly selected radio channel is assigned to a first base station. In step 1B, a check is made to see if the order number of this base station is smaller than the largest allowed order number, i.e. less than 13. If the order number of the assigned radio channel is less than 13, the next radio channel in order is assigned to the next base station in step 1C. If the order number of the assigned radio channel is not less than the largest allowed order number, i.e. 13, but equal to 13, a radio channel whose order number is the smallest allowed, i.e. in this example one, is assigned to the next base station in step 1C. This way radio channels are assigned in order until the end of the production lot. In step 1D, a check is made to see if base stations to which radio channels are to be assigned still exist. If so, the process returns to step 1B. If not, the radio channel assignment process ends.

Figure 2:
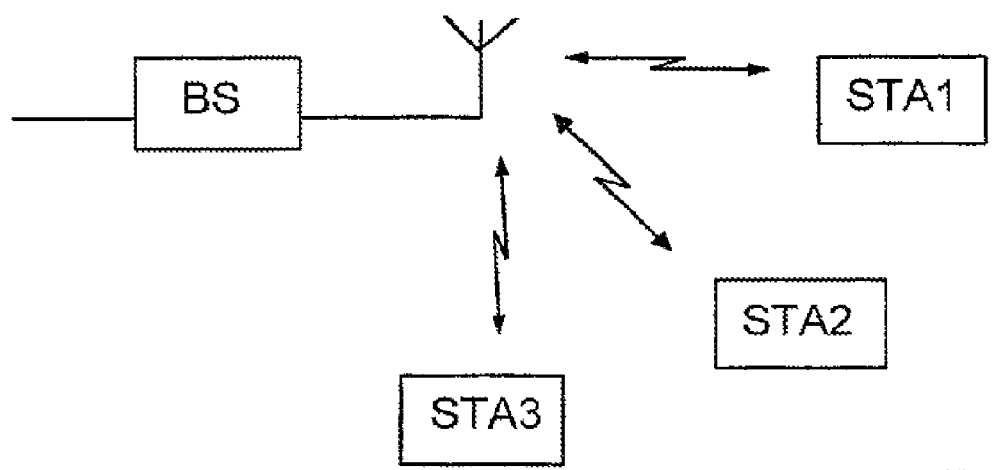
FIG. 2 is a block diagram of a system to which the inventive method is applicable.

FIG. 2 is a block diagram of a system to which the inventive method is applicable. The wireless local area network shown comprises a base station BS and terminals STA1, STA2, STA3, which have a radio channel connection to the base station BS. The base station may be an ADSL terminal (Asymmetric Digital Subscriber Line), enabling a fast Internet connection. Such a wireless local area network is typically located at a home or a small office. The terminals STA1, STA2, STA3 may be for example portable computers having a local area network card or household appliances controlled from the network.

Let us assume that before delivery an individual network name and a certain radio channel to be used are set at the factory as default values for the base station BS. Before the terminals STA1, STA2, STA3 can be coupled to the network, the same network name has to be given to the terminals STA1, STA2, STA3. The network name of the base station BS, the name being e.g. part of a running serial number, can be read from a sticker attached to the base station BS and input in the terminals STA1, STA2, STA3. Once the base station BS is switched on, it starts to send a signal on the selected radio channel. At this point, the terminals STA1, STA2, STA3 are unaware of the radio channel selected, since at the factory, radio channels are assigned to base stations such that all radio channels are used equally in the entire production lot. Once the same network name is input in the terminals STA1, STA2, STA3 as is in the base station BS, the terminals STA1, STA2, STA3 detect the signal including the network name sent by the base station BS and use it to find the radio channel employed for communication. This is carried out by the terminals STA1, STA2, STA3 going systematically through all available radio channels until they find the channel on which their network name appears.

The above method of selecting a radio channel and a network name aims at optimal network performance by minimizing intra-network interference. An individual network name and equal use of all radio channels minimizes the probability of interference between adjacent wireless local area network.

It is to be understood that the above specification and the related figures are only intended to illustrate the present invention. Different variations and modifications of the invention are apparent to those skilled in the art, without deviating from the scope and spirit of the invention disclosed in the attached claims.

What is claimed is:

1. A method for connecting a terminal to a base station in a wireless network, the method comprising:
   receiving a network name of the base station at the terminal, wherein the network name is assigned to the base station during manufacture of the base station and a radio channel from a set of radio channels is randomly assigned to the base station during manufacture of the base station;
   searching, at the terminal, through a set of available radio channels using the network name to determine the radio channel randomly assigned to the base station; and
   connecting the terminal to the base station via the randomly assigned radio channel.

2. A method for manufacturing a production lot of base stations configured to serve a plurality of terminals connected over a wireless local area network, the method comprising:
   assigning a network name to a base station;
   assigning a radio channel to each base station, wherein the radio channel is selected to be used by the wireless local area network at random from a plurality of radio channels;
   setting the assigned radio channel and the network name as default settings during manufacture of each base station in the production lot; and
   associating the network name with a radio channel identification.

3. The method as claimed in claim 2, wherein assigning a network name to each base station comprises assigning at least a portion of a running serial number associated with the base station to the network name.

4. The method as claimed in claim 2, wherein each base station is a wireless base station.

5. A method for generating a network name for a base station (BS) serving a plurality of terminals connected over a local area network, the method comprising:
   assigning an individual network name to the base station during manufacture of the base station;
   providing the base station with a marking from which the individual network name can be read;
   assigning the individual network name as a default network name of the base station;
   randomly selecting a certain radio channel to be used by the local area network;
   assigning the certain radio channel to the BS;
   setting the certain radio channel as a default setting during manufacture of the BS; and
   associating the network name with a radio channel identification.

6. The method as claimed in claim 5, wherein the network name for the BS is based on an individual serial number of the BS.

7. The method as claimed in claim 5, wherein the network name of the base station is permanently fastened to the BS.

8. The method as claimed in claim 5, wherein the radio channel identification is derived from the marking provided on the BS.

9. The method as claimed in claim 5, wherein the BS is an Asymmetric Digital Subscriber Line (ADSL) terminal enabling fast Internet connection from a terminal connected to the BS.

10. The method as claimed in claim 9, wherein the terminal is a personal computer.

11. A base station (BS) in a wireless network, comprising:
   a marking that identifies an individual network name assigned to the BS during manufacture, wherein the individual network name is selected randomly and the marking is a label with a serial number assigned to the BS; and
   a transceiver configured to communicate with a terminal on a radio channel assigned to the BS during manufacture, wherein the radio channel is selected randomly, thereby reducing a likelihood that the same radio channel is used by any adjacent base station.

12. The BS as claimed in claim 11, wherein the network name is part of the serial number assigned to the BS.

13. A method for manufacturing a plurality of base stations, the method comprising:
   determining a set of available radio channels that the plurality of base stations may use for communications, wherein each of the available radio channels in the set of available radio channels is assigned one of a plurality of consecutive channel numbers;

selecting a radio channel at random from the set of available radio channels for one of the plurality of base stations during manufacture of the plurality of base stations;

assigning the selected radio channel to the one of the plurality of base stations during manufacture of the plurality of base stations and assigning radio channels from the set of available radio channels to remaining base stations in the plurality of base stations consecutively, beginning with a next channel number after the channel number selected at random for the one of the plurality of base stations; and setting the assigned radio channel as a default setting in at least one of the plurality of base stations.

* * * * *